United States Patent

[11] 3,625,467

[72] Inventor Willy Schaerer
Terrassenweg 18, Bern, Switzerland
[21] Appl. No. 9,269
[22] Filed Feb. 6, 1970
[45] Patented Dec. 7, 1971
[32] Priority Feb. 17, 1969
[33] Switzerland
[31] 2342/69

[54] MOVABLE SUPPORT DEVICE FOR AT LEAST ONE INSTRUMENT SERVING TO MEASURE THE DIMENSIONS OF AN OBJECT
11 Claims, 2 Drawing Figs.

[52] U.S. Cl. ................................................ 248/405, 33/170
[51] Int. Cl. ............................................... G01b 3/22
[50] Field of Search ........................................ 248/405, 406, 404, 411, 124, 125; 33/170, 172 C, 169 R, 171, 172, 173, 169 F

[56] References Cited
UNITED STATES PATENTS

| | | | |
|---|---|---|---|
| 2,590,455 | 3/1952 | Pittenger | 33/170 |
| 2,611,186 | 9/1952 | Noble | 33/170 |
| 2,952,077 | 9/1960 | Burgess et al. | 33/170 |
| 3,078,582 | 2/1963 | Bechler | 33/170 |
| 3,348,421 | 10/1967 | Boice | 248/125 X |
| 3,362,668 | 1/1968 | Reinhart | 248/125 |

*Primary Examiner*—J. Franklin Foss
*Attorney*—Werner W. Kleeman

ABSTRACT: There is disclosed a movable support device for at least one instrument serving to measure the dimensions of an object, which support device is of the type incorporating a base which carries an orientation or aligning plate and at which there is supported a movable column member. A freely disposed portion of this column member is cylindrical and carries a movable element which is provided with means for positioning at least a given measuring instrument with respect to the orientation plate. Furthermore, this element possesses a bore and by means of a sliding bearing equipped with a cage and prebiased balls is linearly guided at the freely disposed cylindrical portion of the column member. According to an important aspect of the invention, a bushing or sleeve member is inserted in the bore of the movable element and adhesively secured and, further, possesses a perfectly smooth and cylindrical inner surface. This inner surface cooperates with the balls of the sliding bearing and the freely disposed portion of the column member, in order to insure for a perfect linear guiding of the movable element upon this column portion. In order to control the movements of this element with respect to the column member, there is further provided a mechanism which incorporates a support arrangement formed from at least two carbide metal parts having two surfaces in contact with one another, wherein of these two surfaces which contact one another of such two carbide metal parts one is formed to be substantially flat and the other spherical.

PATENTED DEC 7 1971 3,625,467

INVENTOR:
Willy Schaerer
By Werner W. Kleeman
His Attorney

3,625,467

MOVABLE SUPPORT DEVICE FOR AT LEAST ONE INSTRUMENT SERVING TO MEASURE THE DIMENSIONS OF AN OBJECT

BACKGROUND OF THE INVENTION

The present invention relates to a new and improved movable support device for at least one instrument serving to measure the dimensions of an object.

Dial gauges, extensometers, and similar instruments for measuring dimensions of an object must be mounted upon movable support devices or arrangements when they are used to carry out measurements under such conditions that the feeler member cannot easily be raised. Attempts have already been made to develop movable support devices, yet the desired results have not been satisfactory because these devices are the cause of decisive or considerable measuring errors. These measuring errors can be attributed to deformations which occur in these devices during the mounting thereof or during the use thereof.

SUMMARY OF THE INVENTION

Accordingly, it is a primary object of the present invention to provide an improved movable support device of the type described which effectively overcomes the aforementioned drawbacks of the prior art constructions.

Still another more specific object of the present invention relates to the design of such a movable support device which also makes it possible to quickly and without difficulty displace the measuring instrument or instruments mounted thereon into and out of their position of use.

Yet a further significant object of the present invention relates to the provision of an improved movable support device for instruments or the like serving to measure the dimensions of an object, such support device being relatively simple in construction, economical to manufacture, relatively easy to use, highly reliable in operation, not readily subject to breakdown, and capable of fulfilling with relatively extreme accuracy the purposes for which it was designed.

Now, in order to fulfill these and still further objects of the invention, which will become more readily apparent as the description proceeds, it will be understood that the movable support device for at least one instrument serving to measure the dimensions of an object comprises a base or socket which carries an orientation plate and at which there is supported a movable column number. A freely disposed portion of this column member is substantially cylindrical and carries a movable element which is equipped with means for positioning at least a given measuring instrument with respect to the orientation plate member. Furthermore, this element possesses a bore and by means of a sliding bearing with a cage and prebiased balls in linearly guided at the freely disposed cylindrical portion of the column member. According to an important aspect of the invention, a sleeve or bushing member is inserted in the bore of the movable element and is adhesively secured therein and possesses a perfectly smooth and cylindrical inner surface. This inner surface cooperates with the balls of the sliding bearing and the freely disposed portion of the column member, in order to insure for a perfect linear guiding of the movable element upon this column portion. Furthermore, for the purpose of controlling the movements of this element with respect to the column member, there is provided a mechanism embodying a support arrangement which is formed from at least two hard metal or carbide metal parts, wherein of both surfaces of both of the carbide metal parts which surfaces contact one another one is formed to be substantially flat and the other is formed substantially spherically.

BRIEF DESCRIPTION OF THE DRAWING

Other features, objects and advantages of the present invention will become apparent by reference to the following detailed description and drawings, wherein.

DETAILED DESCRIPTION OF THE PREFERRED EMBODIMENTS

Figures 1, 2:
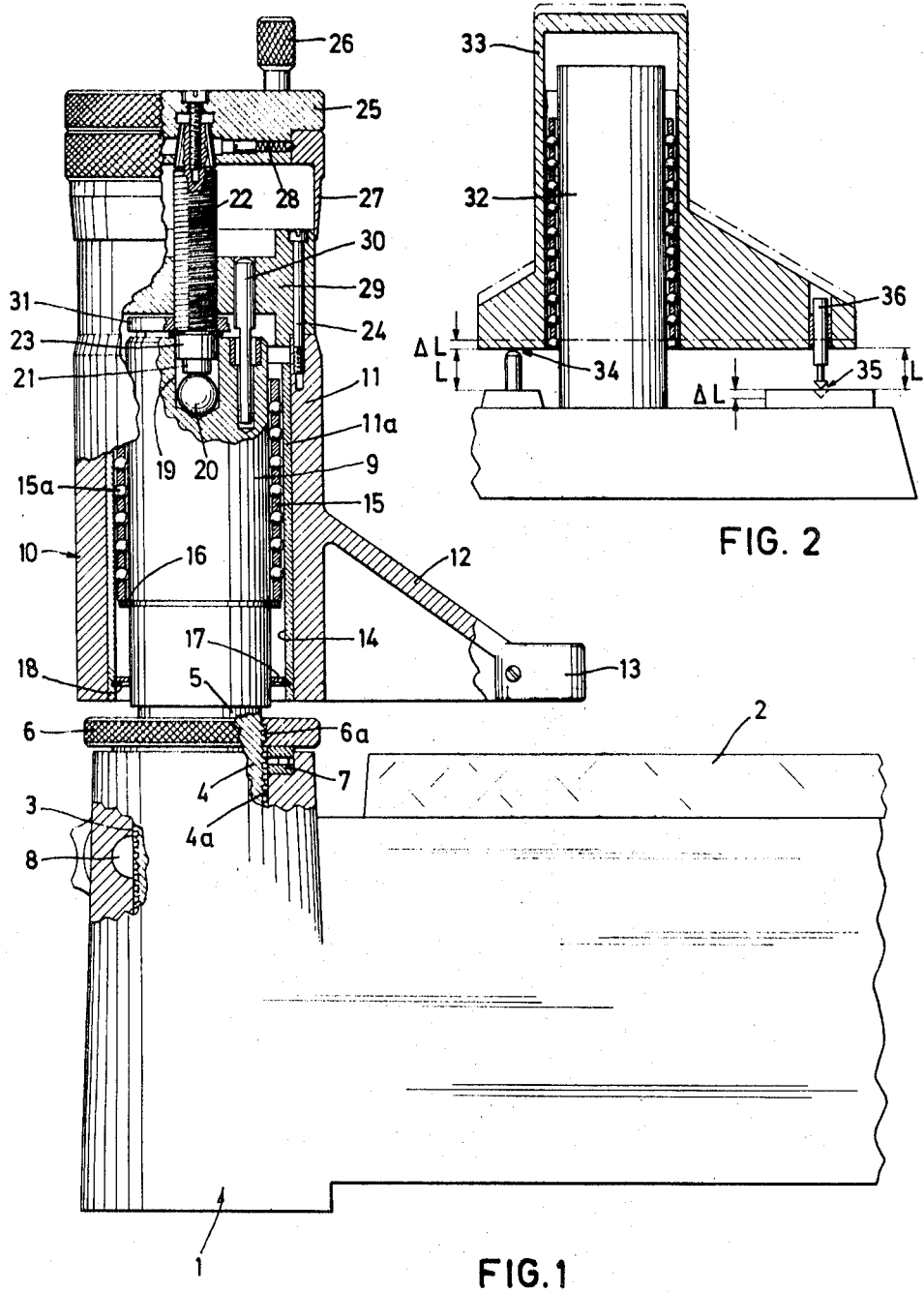
FIG. 1 is an elevational view, partially in section, of a preferred embodiment of inventive support device or arrangement.
FIG. 2 is a fragmentary elevational view, also partially in section, of a modified version of support device designed according to the teachings of the invention.

Describing now the drawing, the inventive exemplary embodiment of support arrangement depicted in FIG. 1 will be seen to embody a base or socket 1 upon which is mounted an orientation or aligning plate member 2 consisting of marble or hardened steel, for example. The base member 1 will be further seen to possess a vertically extending bore 3. The lower portion 4 of a column member 5 is inserted in this bore 3, this lower portion 4 having threading 4a which, for instance, is of substantially quadratic or square profile. A threaded ring member 6 is arranged above the bore 3 and which is supported upon the base 1 by means of a needle support bearing arrangement 7. The internal threading 6a of the threaded ring member 6 cooperates with the threading 4a of the column portion 4. This column portion 4 fits practically without play in the associated bore 3. A suitable arresting device 8 of conventional construction is arranged in the base or socket 1 and renders it possible to block the column member 5 in the base 1.

The upper portion 9 of the column member 5 is manufactured or machined in such a fashion that it forms a perfect cylinder. This portion 9 of the column member 5 carries the movable element 10 of the support device. This element 10 incorporates a body member 11 at which there is formed an arm 12 extending over the orientation or aligning plate member 2. At the free end of the arm 12 there is formed a clamping eyelet 13, or equivalent structure, which serves the purpose of receiving the dial gauge or an electronic dimension measuring instrument, or, in fact, any other suitable instrument which is to be received by the inventive support device.

Continuing, it will be seen that the body member 11, in turn, has a bore 11a in which there is inserted a thin, walled sleeve or bushing 14 formed of hardened steel. During mounting this bushing or sleeve 14 should be freely inserted and secured to the body member 11 by a suitable adhesive; for instance, an adhesive suitable for this purpose which is available commercially under the trademark "LOCTIDE" has been found to be particularly useful for this purpose. The inner surface of this sleeve or bushing 14 is ground and lapped, so that it is perfectly cylindrical and smooth. It serves as the contact surface for prebiased ball members 15a of a sliding bearing arrangement which further incorporates a cage member 15. By means of this sliding bearing arrangement the movable element 10 is linearly guided without play upon the upper portion 9 of the column member 5. A slotted ring 16, engaging in a suitable groove of the column portion 9, serves as the lower limit stop for the sliding bearing arrangement. This slotted ring member 16 also serves as a stop member for limiting the element 10 in its upward movement in cooperation with a support disc member 17 which bears upon a slotted ring member 18 which is inserted in a groove of the sleeve or bushing 14, as shown in FIG. 1.

The upper terminal portion 9 of the column member 5 is equipped with a centrally located blind hole 19 in which there is inserted a ball member 20 formed of a hard metal or carbide metal. The smooth and flat underside of a pin member 21 formed of hard metal or carbide metal is in contact with this ball member 20. Pin member 21 belongs to a part 23, which either directly or by means of a needle bearing is guided without play in the upper portion of the blind hole 19 and is situated in the extension of a micrometer screw member 22. The latter operates in a ring 29 which is secured through the agency of a screw 24, or any other suitable equivalent fastening expedient, to the body member 11. The upper portion of the micrometer screw 22 is secured to an actuation ring or drum member 25 which is equipped with an actuating knob 26 and, in turn, supports a ring member 27 which is preferably provided with a scale or other suitable indicia. A mechanism 28 incorporating a spring-loaded ball member, as shown in FIG. 1, is housed in the actuation drum member 25 and serves for coupling the ring member 27 with the actuation drum member 25. A pin member 30 which at its lower region is provided with two oppositely situated bevelled or flattened portions is secured to the ring member 29 and, as shown, moves in a blind hole provided in the upper portion 9 of the column member 5 in order to prevent a rotation of the body member 11 with respect to column member 5. Any suitable clamping device 31 of conventional construction is secured to the upper portion of the column member 5 and acts upon the micrometer screw 22.

The heretofore described support device of the invention works in the following manner: The measuring instrument under consideration is secured in the eyelet 13 of the movable element 10 and, then, the threaded ring member 6 is rotated in order to displace the column member 5 to the desired height. Thereafter, the column member 5 is blocked in the desired position by means of the arresting device 8. Then, the position of the measuring instrument is controlled in that by means of the actuation drum member 25 the micrometer screw 22 is acted upon. By threading up or by threading down this micrometer screw 22 it is possible to raise or lower the body member 11 and thus the arm 12. In this manner the measuring instrument can be raised as soon as the measuring operation has been completed and furthermore, it is possible to again bring such exactly into its working position. For this purpose the components 29 and 27 are preferably provided with suitable indicia or scale means and it is further possible to make use of the ball arresting arrangement 28 additionally with this scale means in order to bring about a zero or null-adjustment. It is furthermore possible to completely dispense with use of any type of scale and to only employ the ball-arresting arrangement 28 in order to bring about this null-positioning.

The described support arrangement is especially useful when it is desired to measure parts which do not permit any raising of the feeler of the measuring instrument, since it is possible with this support device to raise the instrument and to then again place it into its operating or useful position practically without error. The device can be, however, also used for controlling the wear of certain measuring instruments, dial gauges for instance.

Owing to the fact that the sleeve or bushing 14 is secured adhesively in the bore of the body member 11, this sleeve or bushing 14 can be thin-walled and, therefore, can be inserted without force and without deformation during the mounting operation. This deformationless mounting and the high precision-machining of the sleeve member 14 and the upper portion or shaft portion 9 of the column 5 insures for a perfect guiding by virtue of the sliding bearing arrangement 15, 15a, the prebiased ball members 15a of which do not deform. Thus, practically every danger of an error during the raising and again placing into the null-position of the body member 11 is overcome. Additionally, the displacement of the body member 11 together with the measuring instrument can be repeated as often as desired without any positional errors, because the sleeve or bearing 14 does not deform during operation or functioning of the device. This result could not be achieved by means of a sleeve or bushing which was mounted in conventional fashion according to the prior art, because such a conventional mounting or insertion of the sleeve member results in deformations thereof, whereby such deformations are that much more considerable the thinner the sleeve member or bushing is.

The supporting of hard metal upon hard metal of the pin member 21 upon the ball member 20 is especially precise, because the contact between a plane and a ball is always a point contact and because the parts which bear against one another are practically free of wear. Also, this supporting arrangement need not be perfectly centered and it need not lie in the axis of the apparatus, since, on the one hand, the support of the flat portion upon the ball remains exact even when there is a considerable or clear displacement or offset, and because on the other hand, the precision of the guiding of the element 10 upon the column member 5 by means of the ball sliding bearing renders possible a decentering of the force effect, without thereby impairing the functionality of the support device.

Although in the exemplary embodiment the column member is arranged so that its lengthwise axis extends vertically, it could also be situated horizontally or inclined, whereby, then, in place of the force of gravity there would be provided a spring member in order to move the movable element 10 toward the base or socket 1.

Furthermore, instead of displacing the column member in the base by threading, there could be used for the same purpose a completely different mechanism, for instance, there could be provided a suitable hydraulic or pneumatic arrangement.

Furthermore, the arrangement of the ball member 20 and the pin member 21 could be reversed, in that, at the lower end of the micrometer screw 22 there could be mounted a ball member which would bear against a flat surface of a part arranged in the blind hole. Additionally, just as in the one as in the other case, the ball member could be replaced by a part which would be provided with a spherical segment. What is important is the contact between a spherical and a flat or planar surface, whereby the spherical element can possess a large radius.

According to a nonillustrated variant construction of the invention, the device thereof could possess two parallel column members which guide a common movable element which carries one or more measuring instruments. Beneath both column members there would be located an orientation or aligning plate member.

The control of the movable element could be replaced by a digital-system of known construction or by an arrangement, which, for instance, exhibits one or a number of micrometer screws. Furthermore, the control by means of screws could also be replaced by one incorporating an hydraulic or pneumatic piston-and cylinder unit, while retaining a contact between a spherical and a flat or planar element.

In order to eliminate the influence of temperature changes upon the functionality of the support device, it is possible to arrange the contact location between spherical and planar surfaces at a location which is situated at the same height as the measuring instrument. FIG. 2 depicts this type of arrangement in greater detail. Now, by referring to this figure, it should be understood that the expansion of the column member 32 and the upper part 33 of the movable element is without influence and that for a given temperature change with the same coefficient of expansion of both parts, the change in length $\Delta L$ at the support location 34 is the same as that which occurs at the feeler member 35 of the measuring instrument 36, when the levels L are equal to one another. Since the effect of such expansions upon the movable element and upon the measuring instrument are always opposed to one another, there results a compensation of the expansions and the temperature fluctuations are therefore without effect upon the measuring accuracy of the support device. Naturally, also in this case, once again the arrangement of a spherical support upon a planar surface can be reversed with respect to that which is illustrated in FIG. 2, that is to say, the part with the spherical surface could be provided at the movable element and the parts with the planar surface could be provided at the base or socket.

While there is shown and described present preferred embodiments of the invention, it is to be distinctly understood that the invention is not limited thereto, but may be otherwise variously embodied and practiced within the scope of the following claims.

What is claimed is:

1. A movable support device for at least one instrument serving to measure dimensions of an object, comprising a base member, an orientation plate carried by said base member, a column member movably supported at said base member, said column member having a freely disposed portion which is cylindrical, a movable element carried by said cylindrical freely disposed portion of said column member, said movable element further incorporating means for positioning at least one given measuring instrument with respect to said orientation plate, said movable element being provided with bore means, sliding bearing means incorporating cage means and prebiased ball means for linearly guiding said movable element at said freely disposed cylindrical portion of said column member, a sleeve member inserted in said bore means of said movable element and adhesively secured therein, said sleeve member possessing a perfectly smooth and cylindrical inner surface which cooperates with said ball means of said sliding bearing means and said freely disposed portion of said column member, in order to insure for a perfect linear guiding of said movable element upon said freely disposed portion of said column member, and means for controlling the movements of said movable element with respect to said column member, said last-mentioned means incorporating a support arrangement embodying at least two carbide metal parts, wherein said two carbide metal parts have two surfaces which are in contact with one another, wherein one of these surfaces of both carbide metal parts is substantially flat and the other substantially spherical.

2. A movable support device as defined in claim 1, wherein said controlling means incorporates at least one micrometer screw.

3. A movable support device as defined in claim 1, wherein said support arrangement is centered at the lengthwise axis of said column member.

4. A movable support device as defined in claim 1, wherein said support arrangement is disposed next to the lengthwise axis of said column member.

5. A movable support device as defined in claim 1, wherein both of said parts formed of carbide metal of said support arrangement are coaxially arranged.

6. A movable support device as defined in claim 1, wherein the surfaces of the said two carbide metal parts which come in contact with one another contact at substantially a point-shaped contact location which is disposed between both carbide metal parts of said support arrangement at the same height as a feeler surface of the measuring instrument.

7. A movable support device as defined in claim 1, wherein one of said carbide metal parts of said support arrangement is fixedly connected with said movable element and the other of said carbide metal parts is fixedly connected with said column member.

8. A movable support device as defined in claim 1, wherein one of said carbide metal parts of said support arrangement is fixedly connected with said movable element and the other carbide metal part is fixedly connected with said base member.

9. A movable support device as defined in claim 1, wherein said sleeve member is thin-walled.

10. A movable support device as defined in claim 1, wherein said sleeve member is formed of hardened steel.

11. A movable support device as defined in claim 1, wherein the inner surface of said sleeve member is a lapped surface.

* * * * *